US009280854B2

(12) United States Patent
Lauer

(10) Patent No.: US 9,280,854 B2
(45) Date of Patent: Mar. 8, 2016

(54) SYSTEM AND METHOD FOR CUSTOMIZING FIGURINES WITH A SUBJECT'S FACE

(71) Applicant: RIGHT FOOT LLC, Los Angeles, CA (US)

(72) Inventor: Daniel J. Lauer, St. Louis, MO (US)

(73) Assignee: RIGHT FOOT LLC, Los Angeles, CA (US)

(*) Notice: Subject to any disclaimer, the term of this patent is extended or adjusted under 35 U.S.C. 154(b) by 361 days.

(21) Appl. No.: 13/716,197

(22) Filed: Dec. 16, 2012

(65) Prior Publication Data
US 2014/0169659 A1 Jun. 19, 2014

(51) Int. Cl.
*G06K 9/00* (2006.01)
*G06T 19/20* (2011.01)

(52) U.S. Cl.
CPC ......... *G06T 19/20* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 2004/0077274 A1 | 4/2004 | Becker et al. | 446/268 |
| 2006/0003111 A1 | 1/2006 | Tseng | 428/16 |
| 2007/0237908 A1 | 10/2007 | Garnett | 428/7 |
| 2008/0300704 A1 | 12/2008 | Watkins et al. | 700/98 |
| 2011/0069157 A1 | 3/2011 | Ito et al. | 348/51 |
| 2011/0234581 A1 | 9/2011 | Eikelis et al. | 345/419 |
| 2012/0299918 A1 | 11/2012 | Abeloe | 345/420 |

OTHER PUBLICATIONS

Digiteyezer, Paris, France Website: http://www.digiteyezer.com Multiple Camera Image Capturing Systems.
Direct Dimension, Owings Mills, Maryland Website: http://www.shapeshot.com Multiple Camera Image Capturing Systems.
Singular Inversions, Toronto, Ontario, Canada Website: http://www.facegen.com Multiple Camera Image Capturing Systems Software.
Dimensional Imaging, Gasgow, Scotland, UK Website: http://www.di3d.com/index.php Multiple Camera Image Capturing Systems Software.

*Primary Examiner* — Stephen R Koziol
*Assistant Examiner* — Amandeep Saini
(74) *Attorney, Agent, or Firm* — Harness, Dickey & Pierce, P.L.C.

(57) ABSTRACT

A system and method of making an at least partially customized figure emulating a subject is disclosed which involves obtaining at least two two-dimensional images of the face of the subject from different perspectives; and processing the images of the face with a computer processor to create a three dimensional model of the subject's face; scaling the three dimensional model and applying the three dimensional model to a predetermined template adapted to interfit with the head of a figure preform that comprises at least a head. The template is printed and installed on the head portion of the figure preform.

18 Claims, 16 Drawing Sheets

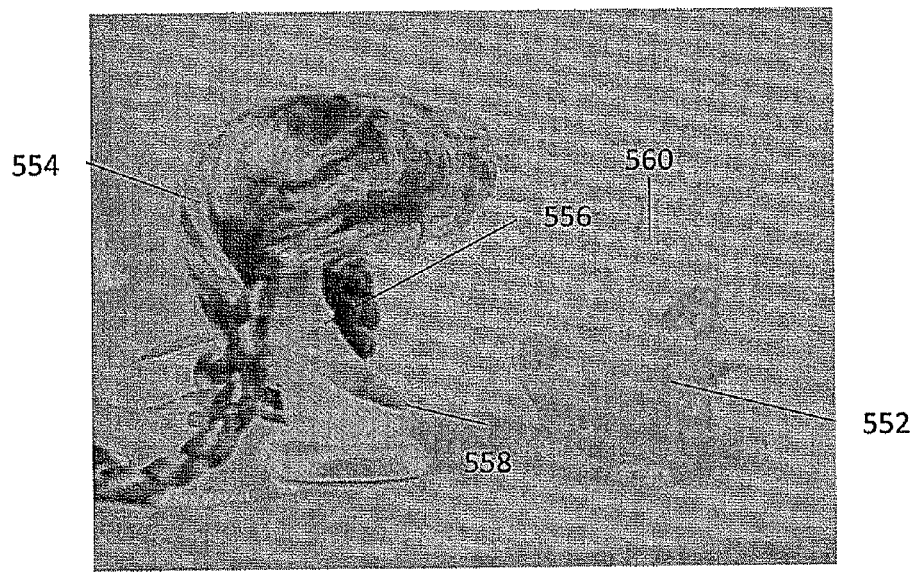
Fig. 18
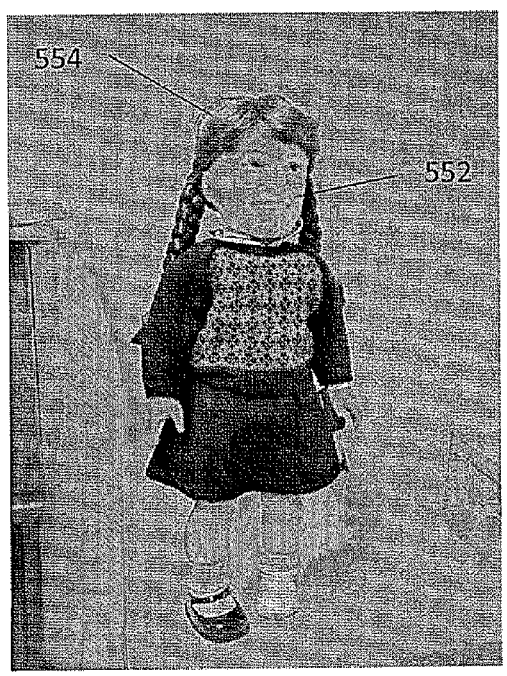
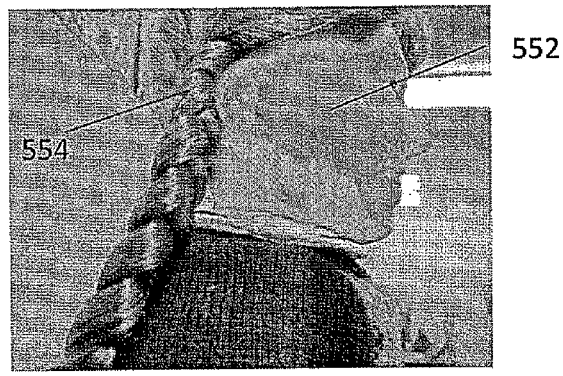
Fig. 20
Fig. 19

SYSTEM AND METHOD FOR CUSTOMIZING FIGURINES WITH A SUBJECT'S FACE

FIELD

The present disclosure relates to a system and method for customizing figurines with a subject's face.

BACKGROUND

This section provides background information related to the present disclosure which is not necessarily prior art.

Three dimensional scanners can be used to create a three dimensional model of a person or object, and various manufacturing technologies such as numerically controlled machining, stereolithography, or three dimensional printing can be used to print the object, However, it can be time consuming and expensive to manufacture an entire object in this fashion. Moreover the choice of materials is usually limited, and the object typically must be made of a single material.

SUMMARY

This section provides a general summary of the disclosure, and is not a comprehensive disclosure of its full scope or all of its features.

Embodiments of the present invention provides a system and method for making an at least partially customized figure emulating a subject, using the subject's specific facial geometry. According to one preferred embodiment, a method of making an at least partially customized figure emulating a subject comprises obtaining at least two two-dimensional images of the face of the subject from different perspectives, and processing the at least two two-dimensional images of the face of the subject with a computer processor to create a three dimensional model of the subject's face. The three dimensional model of the subject's face is scaled to a predetermined size using a computer processor, and applied to a predetermined template having a predetermined perimeter adapted to interfit with the head of a figure preform that comprises at least a head. The template with the three dimensional model of the subject's face is printed on a three dimensional four color printer; and installed on the head portion of the figure preform.

According to another preferred embodiment, a system for making an at least partially customized figure emulating a subject comprises an imaging system for obtaining at least two two-dimensional images of the face of the subject from different perspectives, and a computer processor programmed for processing the at least two two-dimensional images of the face of the subject to create a three dimensional model of the subject's face. The same or a different processor can also scale the three dimensional model of the subject's face to a predetermined size using a computer processor, and apply the model to a predetermined template having a predetermined perimeter adapted to interfit with the head of a figure preform that comprises at least a head. The system further comprises a three dimensional color printer for printing the template with the three dimensional model of the subject's face.

Embodiments of this invention also provide a method of at least partially customizing a standard figure having at least a head, with the face of a subject. According to one preferred embodiment, a method of customizing a standard figure with the face of a subject comprises obtaining at least two two-dimensional images of the face of the subject from different perspectives, and processing the at least two two-dimensional images of the face of the subject with a computer processor to create a three dimensional model of the subject's face. The three dimensional model of the subject's face is scaled to a predetermined size using a computer processor, and applied to a predetermined template having a predetermined perimeter adapted to be mounted on the head of the standard figure. The template with the three dimensional model of the subject's face is printed on a three dimensional four color printer; and installed over the face of the standard figure.

According to another preferred embodiment, a system for at least partially customizing a standard figure with the face of a subject comprises an imaging system for obtaining at least two two-dimensional images of the face of the subject from different perspectives, and a computer processor programmed for processing the at least two two-dimensional images of the face of the subject to create a three dimensional model of the subject's face. The same or a different processor can also scale the three dimensional model of the subject's face to a predetermined size using a computer processor, and apply the model to a predetermined template having a predetermined perimeter adapted to be mounted on the head of a selected figure. The system further comprises a three dimensional color printer for printing a mask based upon the template with the three dimensional model of the subject's face.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 18 is a side elevation view of the mask and the head of the figure preform shown in FIG. 16;

FIG. 19 is a perspective view of the mask installed on the head of the figure preform;

FIG. 20 is a side elevation view of the mask installed on the head of the figure preform

Corresponding reference numerals indicate corresponding parts throughout the several views of the drawings.

DETAILED DESCRIPTION

Example embodiments will now be described more fully with reference to the accompanying drawings.

Figure 1:
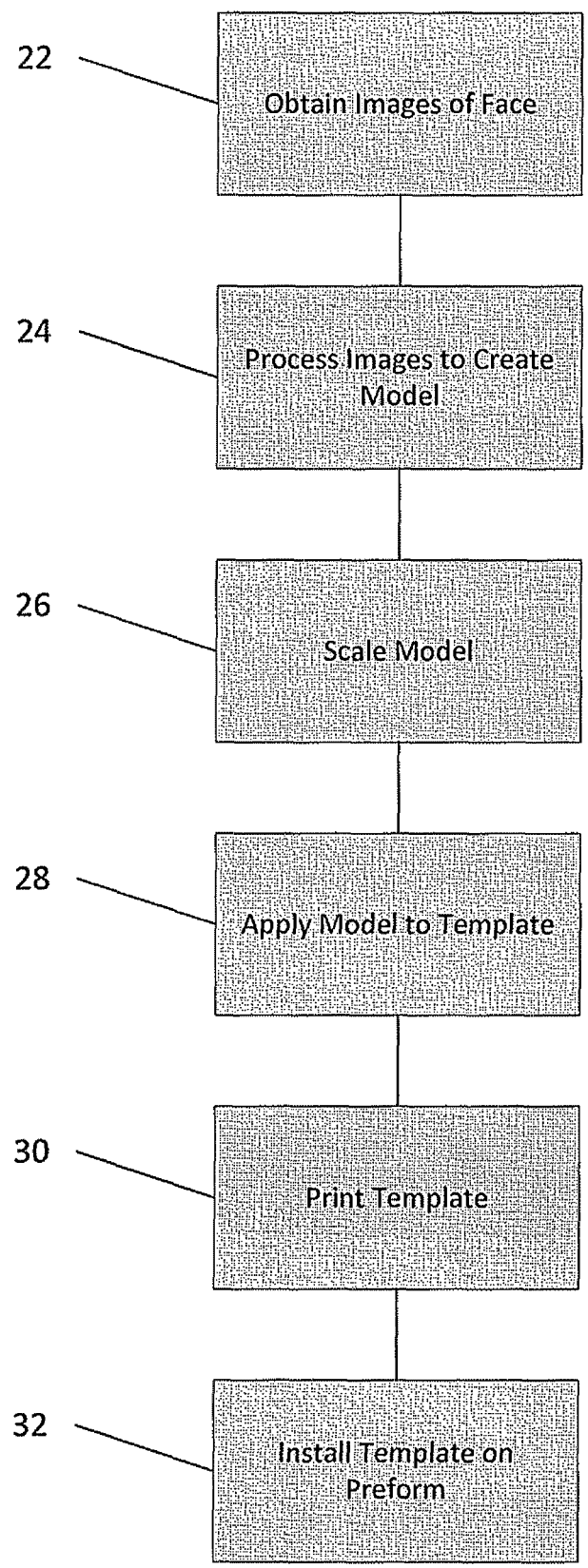
FIG. 1 is a schematic diagram of a method of making an at least partially customized figure emulating a subject according to a preferred embodiment of this invention.

A preferred embodiment of a method of making an at least partially customized figure emulating a subject according to the principles of this invention is indicated schematically in FIG. 1. As shown in FIG. 1 this method can comprise at step 22 obtaining at least two two-dimensional images of the face of the subject from different perspectives. At step 24 at least two two-dimensional images of the face of the subject are processed with a computer processor to create a three dimensional model of the subject's face. At step 26 the three dimensional model of the subject's face is scaled to a predetermined size using a computer processor. At step 28 the three dimensional model of the subject's face is applied to a predetermined template having a predetermined perimeter adapted to interfit with the head of a figure preform that comprises at least a head. At step 30 the template with the three dimensional model of the subject's face is printed on a three dimensional color printer. At step 32 the printed template is installed on the head portion of the figure preform.

The step of obtaining at least two two-dimensional images of the face of the subject from different perspectives can be done with one or more cameras. These cameras are preferably digital cameras. A single camera could be used, and either the subject or the camera repositioned to obtain images from different perspectives. Preferably, multiple cameras are used to simultaneously capture images of the subject from multiple perspectives and so that the relationship between the perspectives is known. Suitable multiple camera image capturing systems include those available from Digiteyezer, 12 Rue Vivienne, Paris 75002 France (http://www.digiteyezer.com) or Direct Dimensions, 10310 S. Dolfield Road, Owings Mills, Md. 21117 (http://www.shapeshot.com).

The images could also be captured by a single moving camera. This allows for near simultaneously acquisition of the images and also allows the relationship between the multiple perspectives to be known. For example a single camera could be mounted on a track to move around a semicircle to capture images of the user from at least two different perspectives. The camera could alternatively include position or inertial sensors (for example an iPhone) so that its movement can be tracked as images are captured, facilitating the use of hand held camera.

The processing of two-dimensional images of the face of a subject to create a three dimensional model of the subject's face is well known, and examples of software for this purpose include facegen, available from Singular Inversions, 2191 Yonge Street, Suite 3412, Toronto, ON. M4S 3H8, CANADA (http://www.facegen.com), or software available for Dimensional Imaging, 1 Ainslie Road, Glasgow, Scotland UK, G52 4RU (http://www.di3d.com/index.php). The scaling of the three dimensional model of the subject's face resizes the image to the appropriate size. This can be accomplished by increasing or decreasing the image to a particular size or size range. The scaling can also be based upon resizing the image to make one or more inter-anatomical distances a particular value, or to be within a particular range of values. For example, through processing particular anatomical features including the location of a portion of one or more of the hair line, eye brows, eyes, ears, nose, mouth, and chin. The model can then be scaled based upon one or more dimensions between these anatomical features. The image can be scaled uniformly, or the image can be scaled differently in different directions. For example, the image can be scaled uniformly so that a particular inter-anatomic distance, such as the distance between the inside corners of the eyes, is a particular dimension, or is within a certain dimensional range. Alternatively the model can be scaled differently in different directions. Thus, the model can be scaled horizontally based upon a first inter-anatomical dimension, and the model scaled vertically based upon a second inter-anatomical dimension. Thus the model can be scaled horizontally so that the distance between, for example, inner corners of the eyes is a particular dimension, or in a particular range of dimensions, and the model can be scaled vertically so that the distance between, for example the tops of the eyebrows and the bottom of the chin, is a particular dimension, or in a particular range of dimensions.

The scaling factor or factors are preferably determined based upon the particular template, which in turn is based upon the figure preform with which the template will be used. The figure can be doll, an action figure, a figurine or statue, etc. These images can also be used as avatars in computer and online applications such as games.

Alternatively the scaling can be accomplished by using providing a template that includes anchor points for anchoring various anatomical features, such as the eyes, eyebrows, ears, nose, and mouth. Thus these individual anatomical features can be appropriately positioned on the template for the particular application.

Instead of, or in addition to, scaling, the size and the positions of the individual anatomical features can be adjusted. For example in many dolls the eyes are disproportionately large compared to other facial features. An accurate translation of human anatomy to such a doll may not be aesthetically pleasing. In many dolls the locations of the individual anatomical features are likewise stylistically positioned, such that an accurate translation of human anatomy to such a doll would not be aesthetically pleasing.

Individual anatomical features can be resized relative to the other anatomical features. For example, the size of the eyes can automatically be increased or decreased by a particular amount, or by a particular ratio. Alternatively the size can be increased or decreased to a particular size or to be within a particular size range. In other embodiments two different anatomical features are differentially resized. For example, for a particular application, it might be desired to increase the size of the eyes by 25% and to increase the size of the mouth by 15%, in another application it might be desired to increase the size of the eyes by 20% and reduce the size of the mouth by 10% such that features are features relative to various.

Individual anatomical features can be repositioned relative to the other anatomical features. For example, the positions of the eyes can automatically be increased to increase their spacing, or decreased to decrease their spacing. This increase or decrease can be by a particular amount, or by a particular ratio. Alternatively the positioned can be moved to a particular position. Some or all of the anatomical features can be repositioned, and this positioning can involve movement in the same or in different directions.

In some embodiments both the size of the features and their positions can be changed relative to other features. Alternatively the resizing and repositioning can be accomplished by providing a template that includes anchor points for anchoring various anatomical features, such as the eyes, eyebrows, ears, nose, and mouth. Thus these individual anatomical features can be appropriately positioned and resized on the template for the particular application.

In accordance with some embodiments, the user can manipulate the model before three dimensional printing. This can be conveniently done by a computer with conventional image manipulation tools, including blemish removal tools, blending tools, blurring and sharpening tools, coloring tools, etc., Additional options for modifications, including jewelry and tattoos can be provided. This allows the user to idealize his or her own images. In addition age regressing or age progressing software can be applied, either to the images before the generation of the model or to the model itself. This allows the user to select an appearance at a past age or at a future age.

The template can be printed on a three dimensional color printer, such as those available from Z Corporation, 333 Three D Systems Circle, Rock Hill, S.C. 29730 USA. A four color printer is preferred because of its ability to accurately render colored objects with little or no need for retouching.

One or more coatings can be applied to the printed template, to improve its surface finish, for example to provide a matte or a gloss finish. The one or more coatings can also improve the "feel" of the template.

Figure 5:
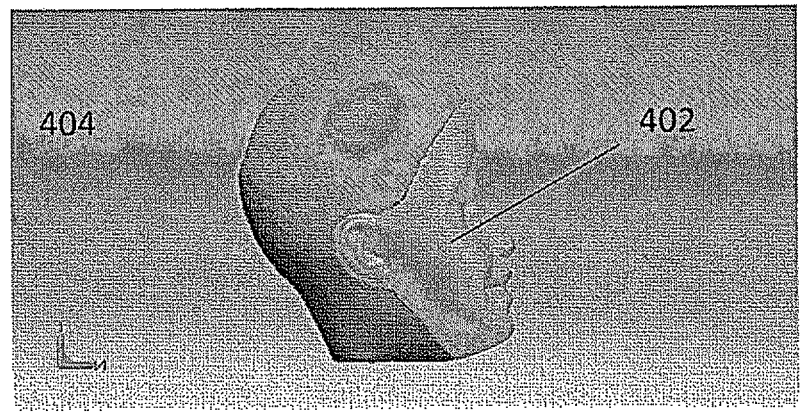
FIG. 5 is side elevation view of a mask installed on the head of a figure preform.
Figure 6:
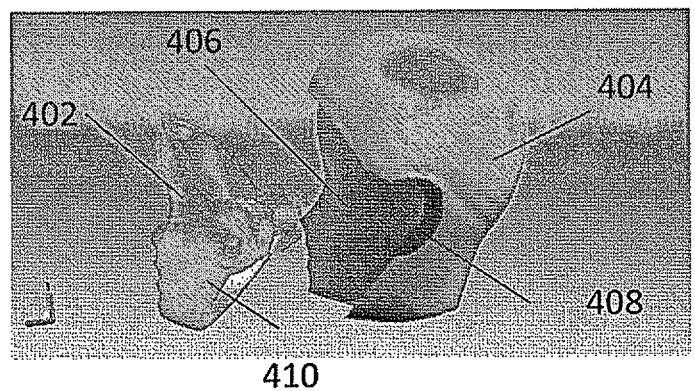
FIG. 6 is a side elevation view of a mask and the head of a figure preform prior to the installation of the mask on the head of the figure preform.
Figure 7:
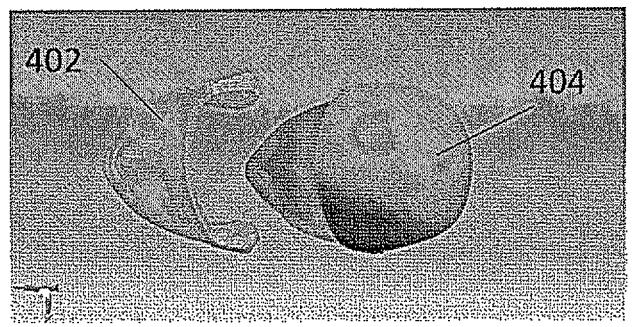
FIG. 7 is a side elevation view of a mask and the head of a figure preform prior to the installation of the mask on the head of the figure preform.
Figure 8:
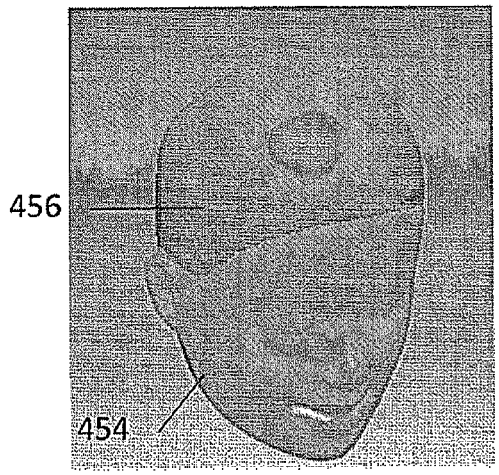
FIG. 8 is a perspective view from above of a mask installed on the head of a figure preform.
Figure 9:
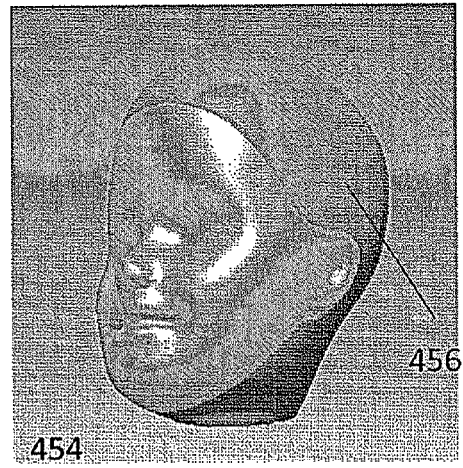
FIG. 9 is a perspective view from below of a mask installed on the head of a figure preform.

FIGS. 5 through 7 show a mask 402 and the head 404 of a of a figure preform. The head 404 has a recess 406, with a perimeter 408, specifically adapted to receive the mask 402. The mask 402 has a perimeter 410 that corresponds to the perimeter 408 of the recess 406. The rear face of the mask is shaped to fit in the recess 406. The particular template used to form the mask 402 includes the required perimeter and the required rear profile to fit with the head of the particular preform. A plurality of templates can be provided so that an appropriate template is available for each a plurality of preforms.

Figure 10:
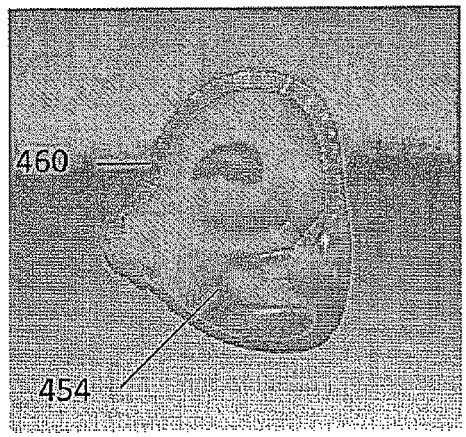
FIG. 10 is a rear perspective view of the mask from behind.
Figure 11:
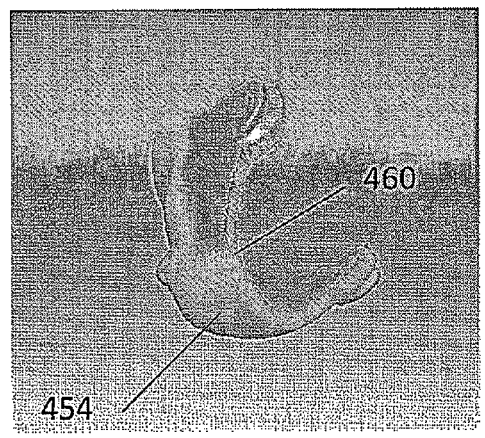
FIG. 11 is a perspective view form below of the mask.
Figure 12:
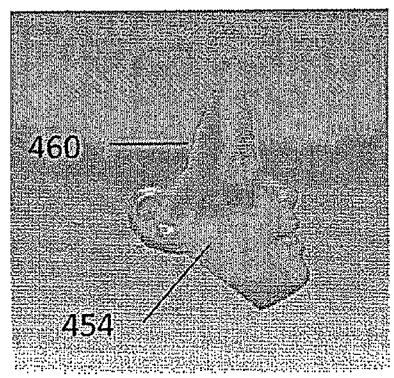
FIG. 12 is a side elevation view of the mask.

FIGS. 8 through 12 show a mask 452 and the head 454 of a figure preform. As shown in FIGS. 10-12, the mask has a perimeter 460 adapted to interfit with a recess for in the head 454 of a figure preform. This perimeter can include a cutout adapted to receive the neck of the head 454 of the figure preform, As shown in FIG. 10, the rear face of the mask 452 is adapted to fit in the recess in the head 454. The particular template used to form the mask 452 includes the required perimeter and the required rear profile to fit with the head of the particular preform. A plurality of templates can be provided so that an appropriate template is available for each a plurality of preforms.

Figure 13:
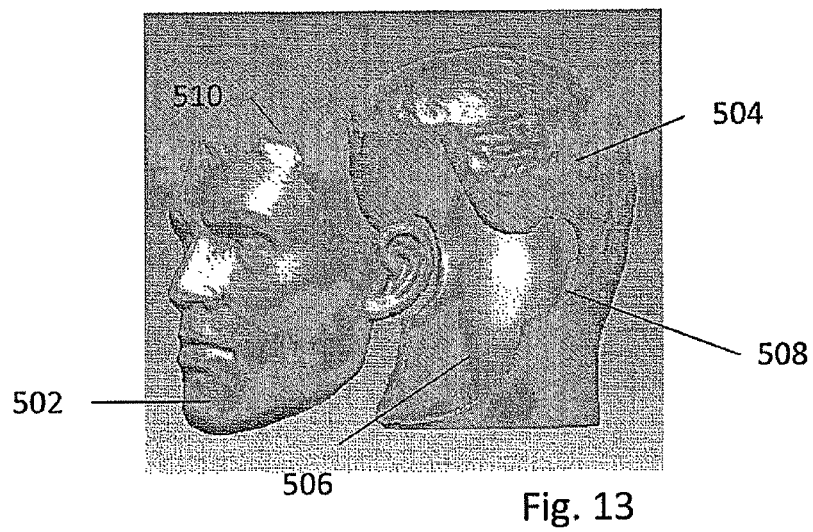
FIG. 13 is a perspective view of a mask prior to installation on the head of figure preform.
Figure 14:
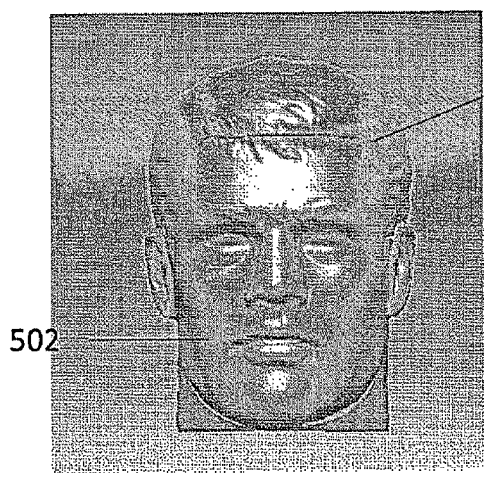
FIG. 14 is a front elevation view of the mask installed on the head of the figure preform.
Figure 15:
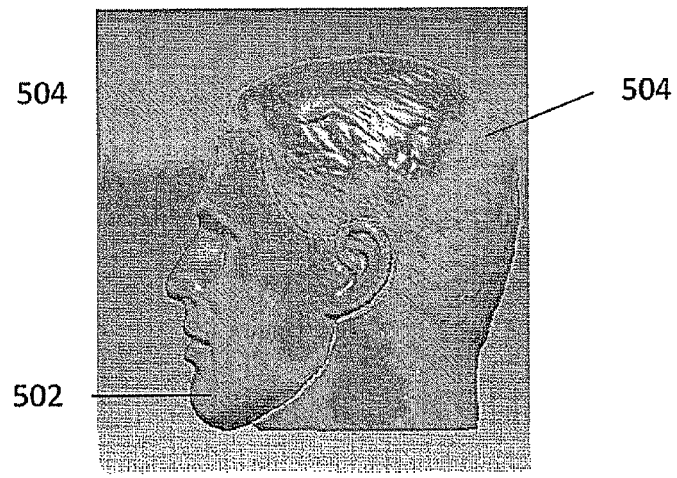
FIG. 15 is a side elevation view of the mask installed on the head of the figure preform.
Figure 16:
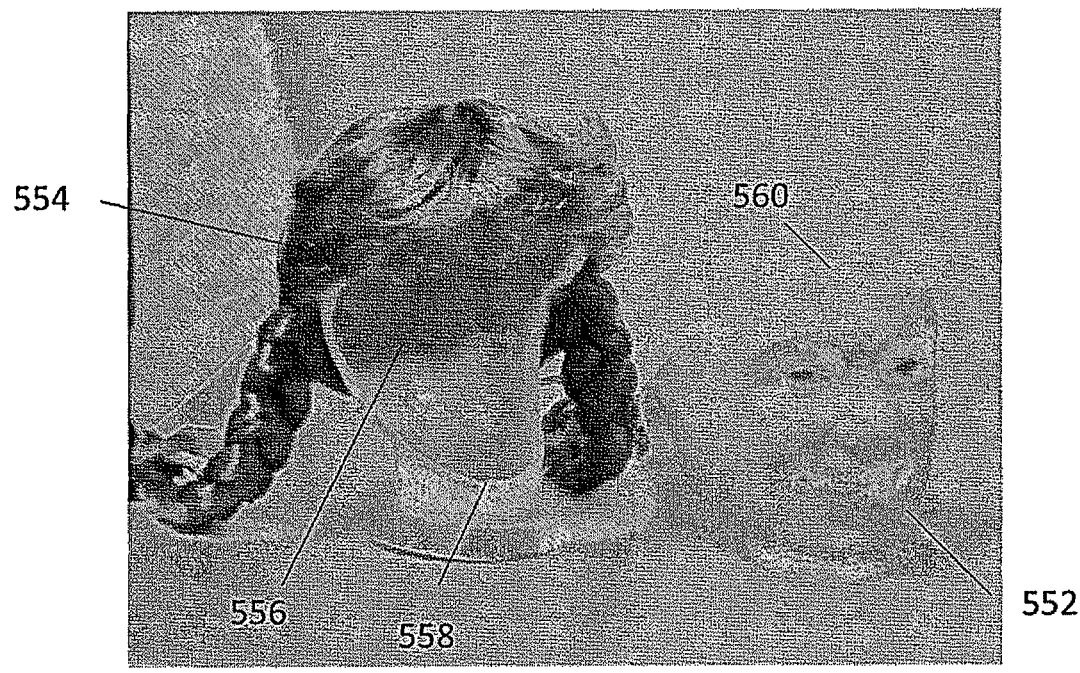
FIG. 16 is a perspective view of a mask and the head of a figure preform.
Figure 17:
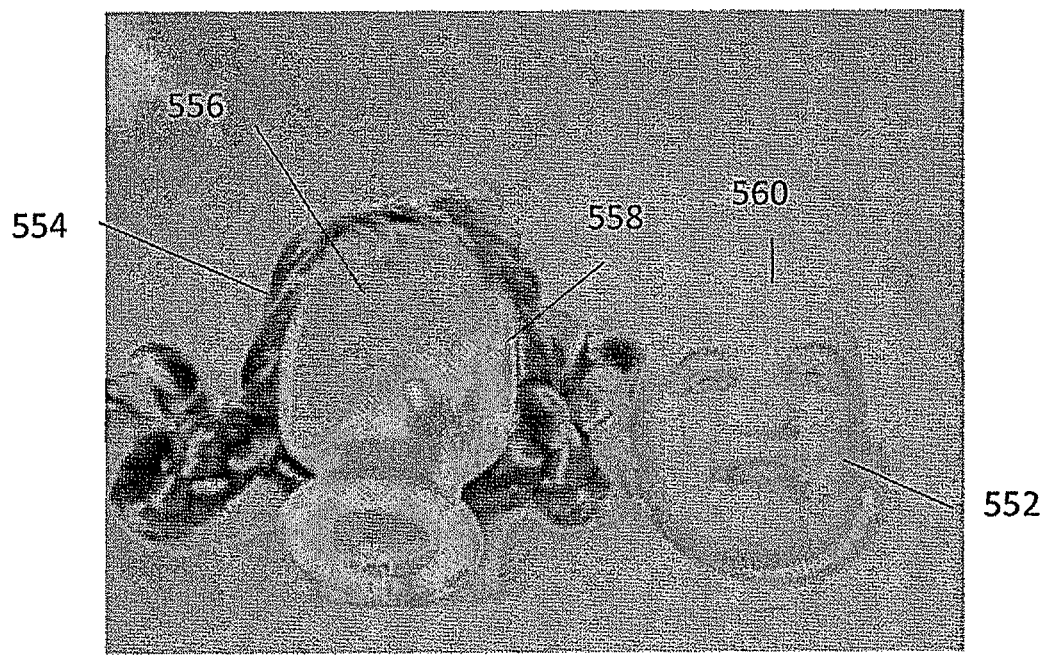
FIG. 17 is a front view of the mask and the head of the figure preform shown in FIG. 16.

FIGS. 13 through 15 show a mask 502 and the head 504 of a of a figure preform. The head 504 has a recess 506, with a perimeter 508, specifically adapted to receive the mask 502. The mask 502 has a perimeter 510 that corresponds to the perimeter 508 of the recess 506. The rear face of the mask is shaped to fit in the recess 506. The particular template used to form the mask 502 includes the required perimeter and the required rear profile to fit with the head of the particular preform. A plurality of templates can be provided so that an appropriate template is available for each a plurality of preforms.

FIGS. 16 through 20 show a mask 552 and the head 554 of a of a figure preform. The head 554 has a recess 556, with a perimeter 558, specifically adapted to receive the mask 552. The mask 552 has a perimeter 510 that corresponds to the perimeter 558 of the recess 556. The rear face of the mask is shaped to fit in the recess 556. The particular template used to form the mask 552 includes the required perimeter and the required rear profile to fit with the head of the particular preform. A plurality of templates can be provided so that an appropriate template is available for each a plurality of preforms.

Figure 21:
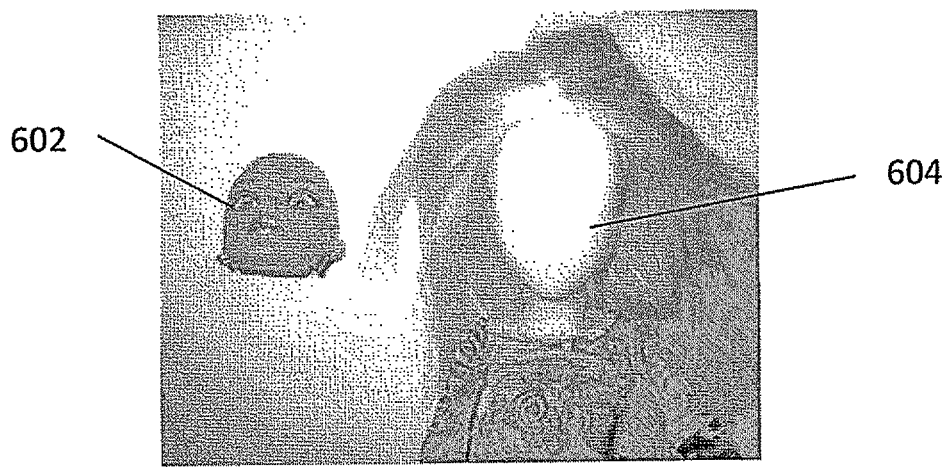
FIG. 21 is a front elevation view of a mask and the head of a figure preform.
Figure 22:
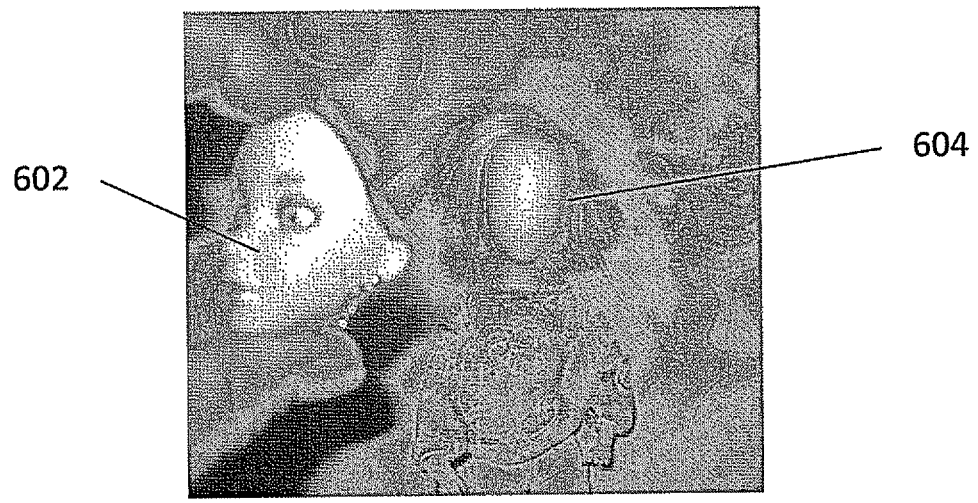
FIG. 22 is a front elevation view of a mask as it is being installed on the head of a figure preform.
Figure 23:
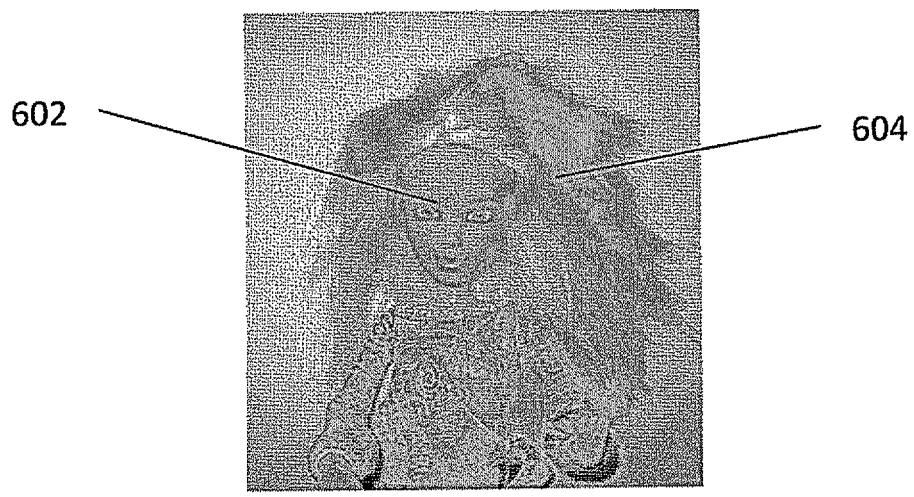
FIG. 23 is a front elevation view of a mask installed on the head of a figure preform.
Figure 24:
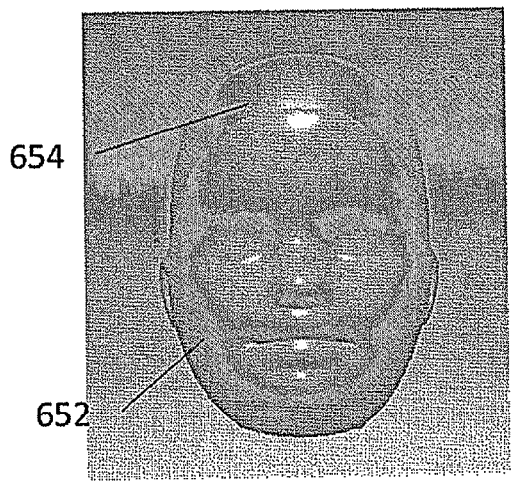
FIG. 24 is a front elevation view of a mask installed over the face of a standard figure.
Figure 25:
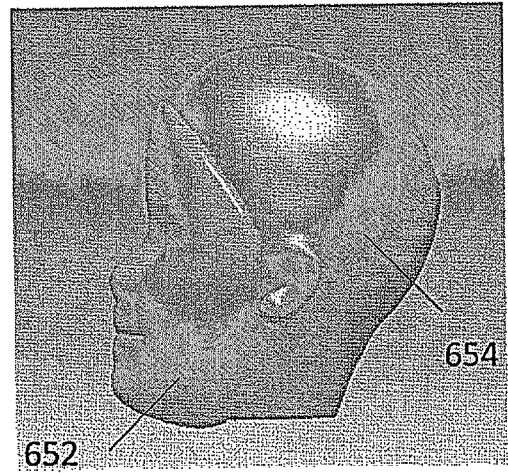
FIG. 25 is a side elevation view of a mask installed over the face of a standard figure.
Figure 26:
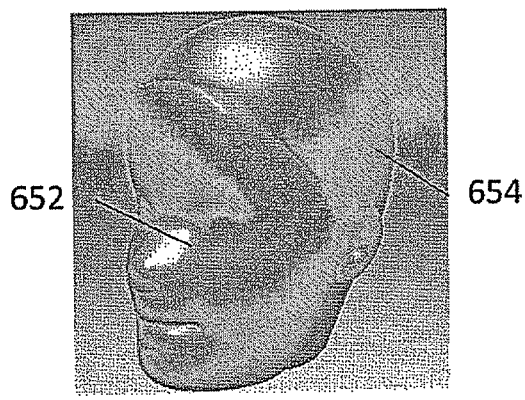
FIG. 26 is a perspective view from the front of a mask installed over the face of a standard figure.
Figure 27:
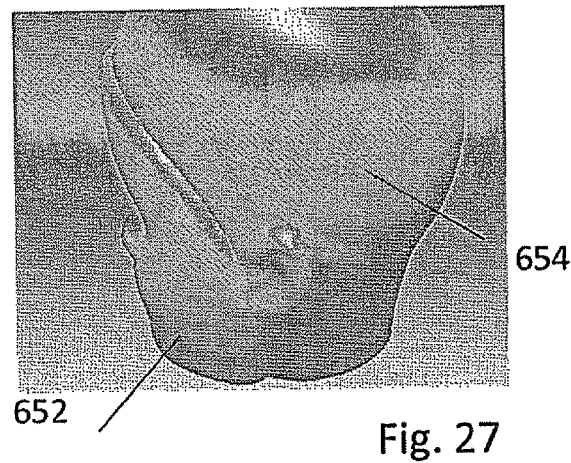
FIG. 27 is a perspective view from the rear of a mask installed over the face of a standard figure.
Figure 28:
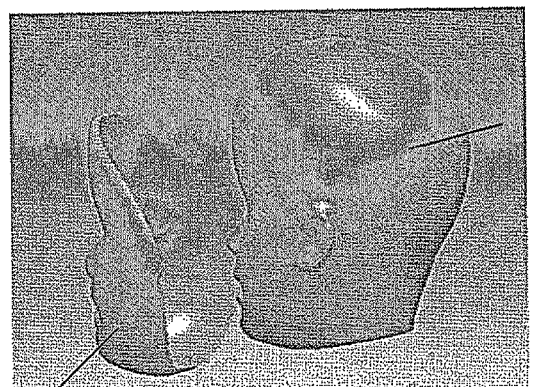
FIG. 28 is a perspective view from the rear of a mask prior to installation over the face of a standard figure.
Figure 29:
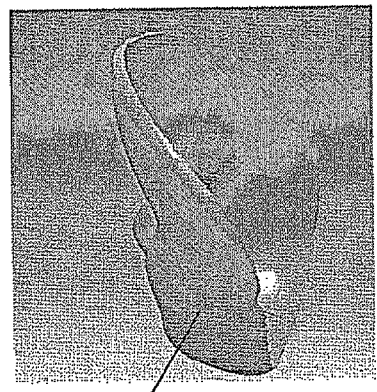
FIG. 29 is a perspective view from the rear of the mask.

FIGS. 21 through 23 show a mask 602 and the head 604 of a of a figure preform. The head 604 has a profile specifically adapted to receive the mask 602. The mask 602 has a perimeter that tapers to fit flush against the surface of the head 604. The rear face of the mask is shaped to fit over the profile of the head 604. The particular template used to form the mask 602 includes the required perimeter and the required rear profile to fit with the head of the particular preform. A plurality of templates can be provided so that an appropriate template is available for each a plurality of preforms.

Figure 2:
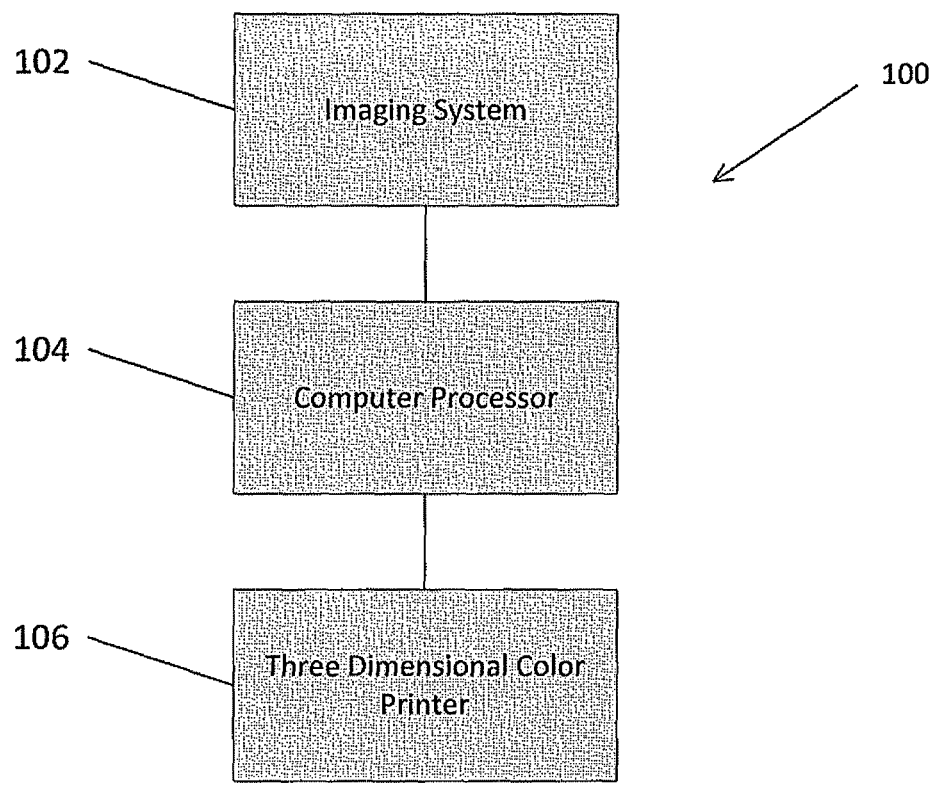
FIG. 2 is a schematic diagram of a system for making an at least partially customized figure emulating a subject according to a preferred embodiment of this invention.

A preferred embodiment of a system for making an at least partially customized figure emulating a subject according to the principles of this invention is indicated generally as 100 in FIG. 2. The system 100 comprises an imaging system 102 for obtaining at least two two-dimensional images of the face of the subject from different perspectives. The system further comprises a computer processor 104 programmed for processing the at least two two-dimensional images of the face of the subject to create a three dimensional model of the subject's face. The processor 104 can also scale the three dimensional model of the subject's face to a predetermined size and apply the model to a predetermined template having a predetermined perimeter adapted to interfit with the head of a figure preform that comprises at least a head. The system 102 further comprises a three dimensional color printer 106 for printing the template with the three dimensional model of the subject's face.

Figure 3:
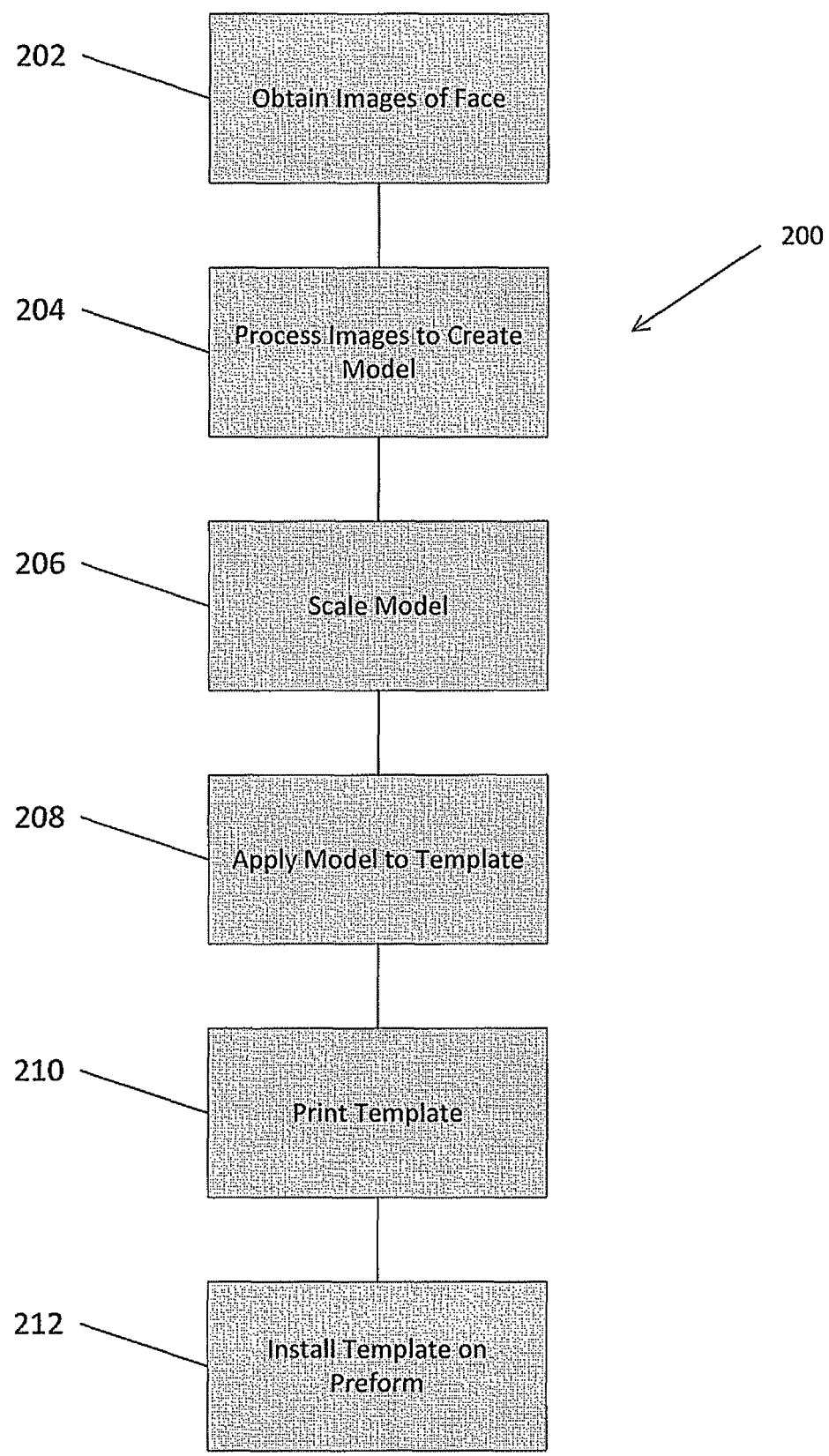
FIG. 3 is a schematic diagram of a method of at least partially customizing a standard figure with the face of a subject according to a preferred embodiment of this invention.

A method of at least partially customizing a standard figure having at least a head, with the face of a subject according to the principles of this invention is indicated generally as 200 in FIG. 3. As shown in FIG. 3 this method comprises at step 202 obtaining at least two two-dimensional images of the face of the subject from different perspectives. At step 204 the at least two two-dimensional images of the face of the subject are processed with a computer processor to create a three dimensional model of the subject's face. At step 208 the three dimensional model of the subject's face is scaled to a predetermined size using a computer processor. At step 210 the model is applied to a predetermined template having a predetermined perimeter adapted to be mounted on the head of the standard figure. At step 212 the template with the three dimensional model of the subject's face is printed on a three dimensional color printer. At step 214 the printed template is installed over the face of the standard figure.

The step of obtaining at least two two-dimensional images of the face of the subject from different perspectives can be done with one or more cameras. These cameras are preferably digital cameras. A single camera could be used, and either the subject or the camera repositioned to obtain images from different perspectives. Preferably, multiple cameras are used to simultaneously capture images of the subject from multiple perspectives and so that the relationship between the perspectives is known. Suitable multiple camera image capturing systems include those available from Digiteyezer, 12 Rue Vivienne, Paris 75002 France (http://www.digiteyezer.com) or Direct Dimensions, 10310 S. Dolfield Road, Owings Mills, Md. 21117 (http://www.shapeshot.com). The images could also be captured by a single moving camera. This allows for near simultaneously acquisition of the images and also allows the relationship between the multiple perspectives to be known. For example a single camera could be mounted on a track to move around a semicircle to capture images of the user from at least two different perspectives. The camera could alternatively include position or inertial sensors (for example an iPhone) so that its movement can be tracked as images are captured.

The processing of two-dimensional images of the face of a subject to create a three dimensional model of the subject's face is well known, and examples of software for this purpose include facegen, available from Singular Inversions, 2191 Yonge Street, Suite 3412, Toronto, ON. M4S 3H8, CANADA (http://www.facegen.com), or software available for Dimensional Imaging, 1 Ainslie Road, Glasgow, Scotland UK, G52 4RU (http://www.di3d.com/index.php).

The scaling of the three dimensional model of the subject's face resizes the image to the appropriate size. This can be accomplished by increasing or decreasing the image to a particular size or size range. The scaling can also be based upon resizing the image to make one or more inter-anatomical distances a particular value, or to be within a particular range of values. For example, through processing particular anatomical features including the location of a portion of one or more of the hair line, eye brows, eyes, ears, nose, mouth, and chin. The model can then be scaled based upon one or more dimensions between these anatomical features. The image can be scaled uniformly, or the image can be scaled differently in different directions. For example, the image can be scaled uniformly so that a particular inter-anatomic distance, such as the distance between the inside corners of the eyes, is a particular dimension, or is within a certain dimensional range. Alternatively the model can be scaled differently in different directions. Thus, the model can be scaled horizontally based upon a first inter-anatomical dimension, and the model scaled vertically based upon a second inter-anatomical dimension. Thus the model can be scaled horizontally so that the distance between, for example, inner corners of the eyes is a particular dimension, or in a particular range of dimensions, and the model can be scaled vertically so that the distance between, for example the tops of the eyebrows and the bottom of the chin, is a particular dimension, or in a particular range of dimensions.

The scaling factor or factors are preferably determined based upon the particular template, which in turn is based upon the figure preform with which the template will be used. The figure can be doll, an action figure, a figurine or statue, etc.

Alternatively the scaling can be accomplished by using providing a template that includes anchor points for anchoring various anatomical features, such as the eyes, eyebrows, ears, nose, and mouth. Thus these individual anatomical features can be appropriately positioned on the template for the particular application.

Instead of, or in addition to, scaling, the size and the positions of the individual anatomical features can be adjusted. For example in many dolls the eyes are disproportionately large compared to other facial features. An accurate translation of human anatomy to such a doll may not be aesthetically pleasing. In many dolls the locations of the individual anatomical features are likewise stylistically positioned, such that an accurate translation of human anatomy to such a doll would not be aesthetically pleasing.

Individual anatomical features can be resized relative to the other anatomical features. For example, the size of the eyes can automatically be increased or decreased by a particular amount, or by a particular ratio. Alternatively the size can be increased or decreased to a particular size or to be within a particular size range. In other embodiments two different anatomical features are differentially resized. For example, for a particular application, it might be desired to increase the size of the eyes by 25% and to increase the size of the mouth by 15%, in another application it might be desired to increase the size of the eyes by 20% and reduce the size of the mouth by 10% such that features are features relative to various.

Individual anatomical features can be repositioned relative to the other anatomical features. For example, the positions of the eyes can automatically be increased to increase their spacing, or decreased to decrease their spacing. This increase or decrease can be by a particular amount, or by a particular ratio. Alternatively the positioned can be moved to a particular position. Some or all of the anatomical features can be repositioned, and this positioning can involve movement in the same or in different directions.

In some embodiments both the size of the features and their positions can be changed relative to other features. Alternatively the resizing and repositioning can be accomplished by providing a template that includes anchor points for anchoring various anatomical features, such as the eyes, eyebrows, ears, nose, and mouth. Thus these individual anatomical features can be appropriately positioned and resized on the template for the particular application.

In accordance with some embodiments, the user can manipulate the model before three dimensional printing. This can be conveniently done by a computer with conventional image manipulation tools, including blemish removal tools, blending tools, blurring and sharpening tools, coloring tools, etc. Additional options for modifications, including jewelry and tattoos can be provided. This allows the user to idealize his or her own images. In addition age regressing or age progressing software can be applied, either to the images before the generation of the model or to the model itself. This allows the user to select an appearance at a past age or at a future age.

The template can be printed on a three dimensional color printer, such as those available from Z Corporation, 333 Three D Systems Circle, Rock Hill, S.C. 29730 USA. A four color printer is preferred because of its ability to accurately render colored objects with little or no need for retouching. One or more coatings can be applied to the printed template, to improve its surface finish, for example to provide a matte or a gloss finish. The one or more coatings can also improve the "feel" of the template.

FIGS. 24 through 29 show a mask 652 and the head 654 of a standard figure, such as a commercially available doll or action figure. The mask 652 has a perimeter that tapers to fit flush against the surface of the head 654. The rear face of the mask 652 is shaped to fit over the profile of the head 654. The rear face can have a concave shape to accommodate the existing facial features on the head 654, or the rear face can have a negative image of the existing facial features to receive the facial features. The particular template used to form the mask 652 includes the required perimeter and the required rear profile to fit with the head of the particular figure. A plurality of templates can be provided so that an appropriate template is available for each a plurality of available figures.

Figure 30:
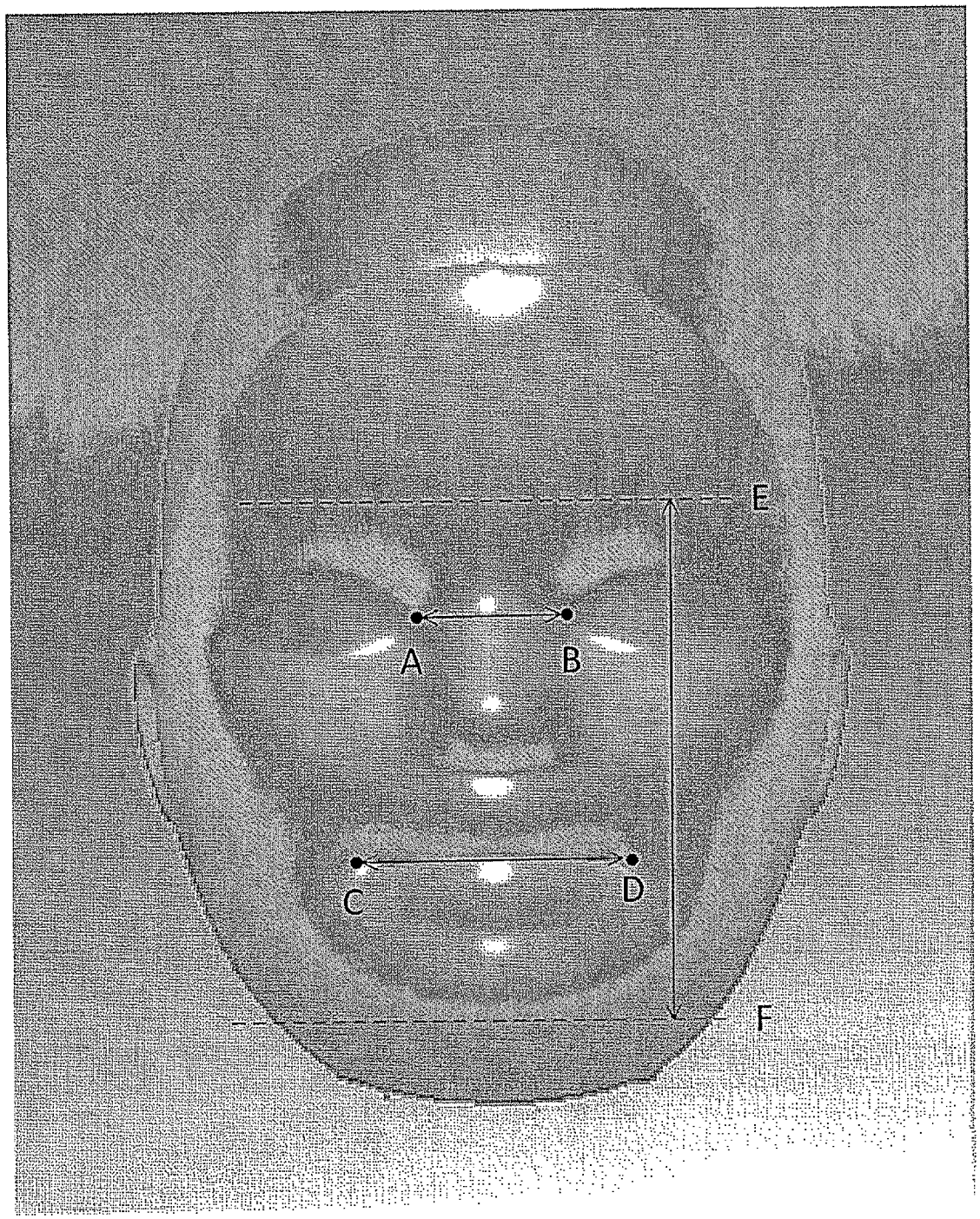
FIG. 30 is an enlarged front elevation view of a mask installed over the face of a standard figure, showing the various dimensions useful for scaling.

FIG. 30 shows the mask 652, described above, marked with possible anatomical measures for scaling a three dimensional model with a template. Through image processing it is possible to identify particular anatomical locations and use these locations as landmarks. As shown in FIG. 30, the inside corners of the eyes can be identified on the model and anchored to corresponding points on the template for example points A and B, or the distance between the inside corners of the eyes can be scaled to the distance A B on the template. Alternatively, the outside corners of the mount can be identified on the model and anchored to corresponding points on the template, for example points C and D, or the distance between the outside corners of the mouth can be scaled to the distance CD on the template. Alternatively lines, for example the line identifying the upper edges of the eyebrows and the line identifying the edge of the chin can be identified and anchored to corresponding lines on the template, for example lines E and F, or the distance between these lines can be scaled to the distance between lines E and F on the template.

Figure 31:
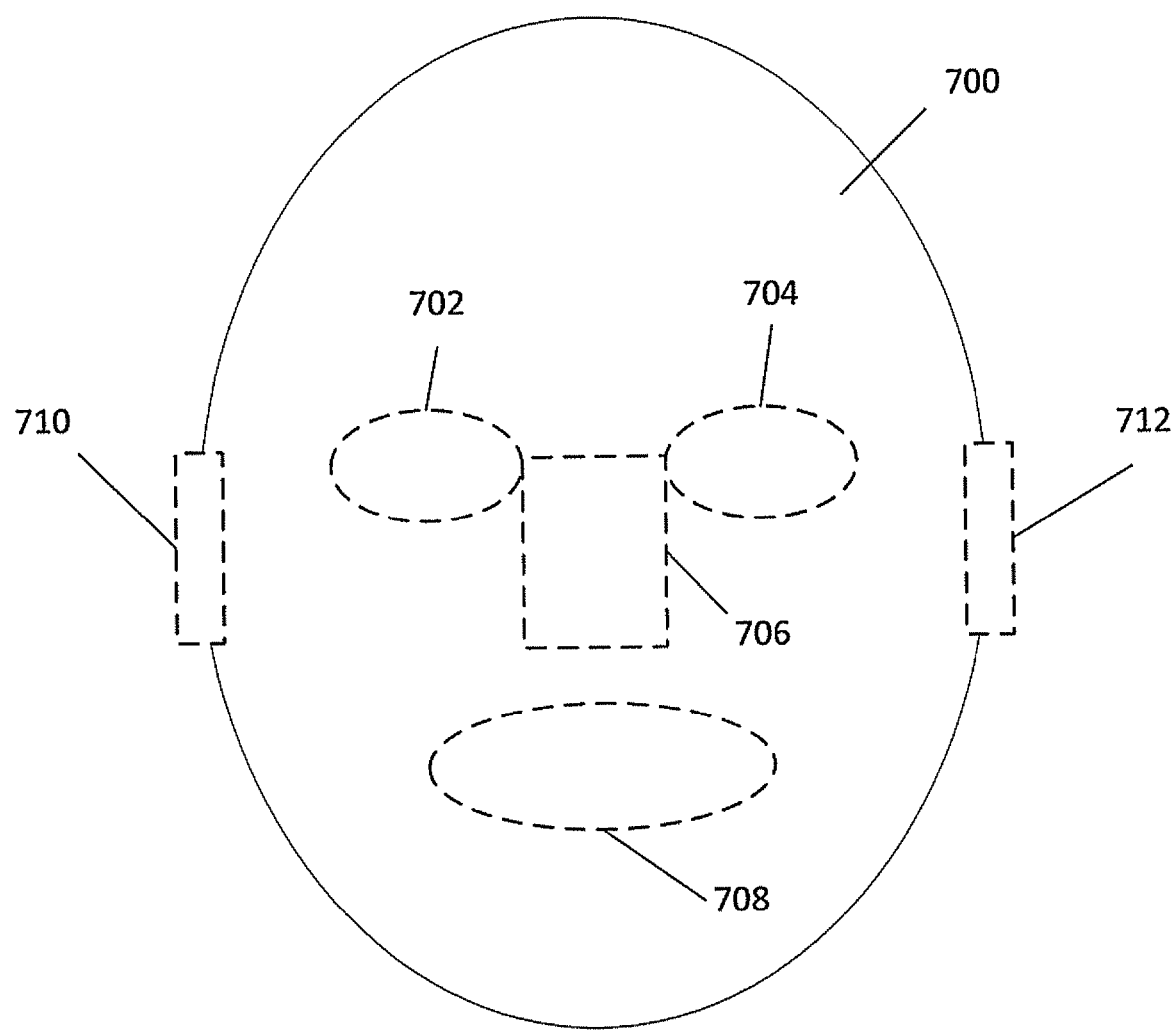
FIG. 31 is a schematic view of a template that can be used in the various embodiments of this invention to position and size the individual facials features for a particular application.
Figure 32:
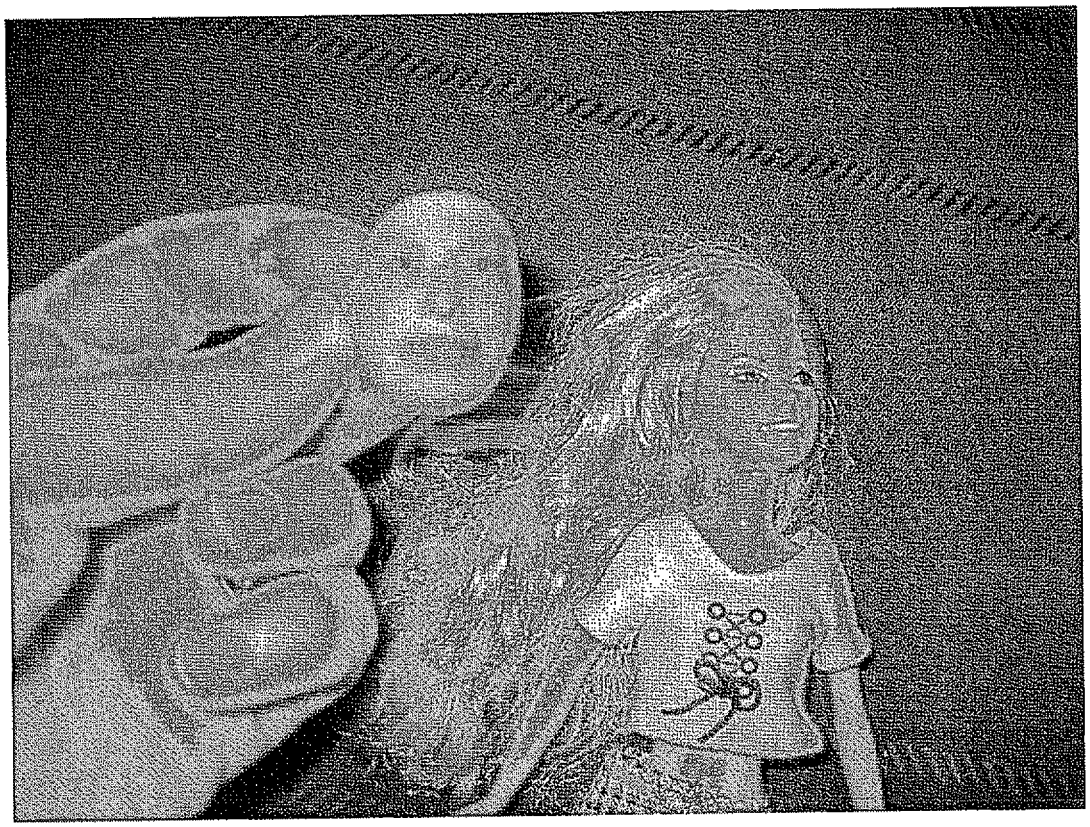
FIG. 32 is a front elevation view of a mask constructed adapted for mounting on a standard fashion doll.
Figure 33:
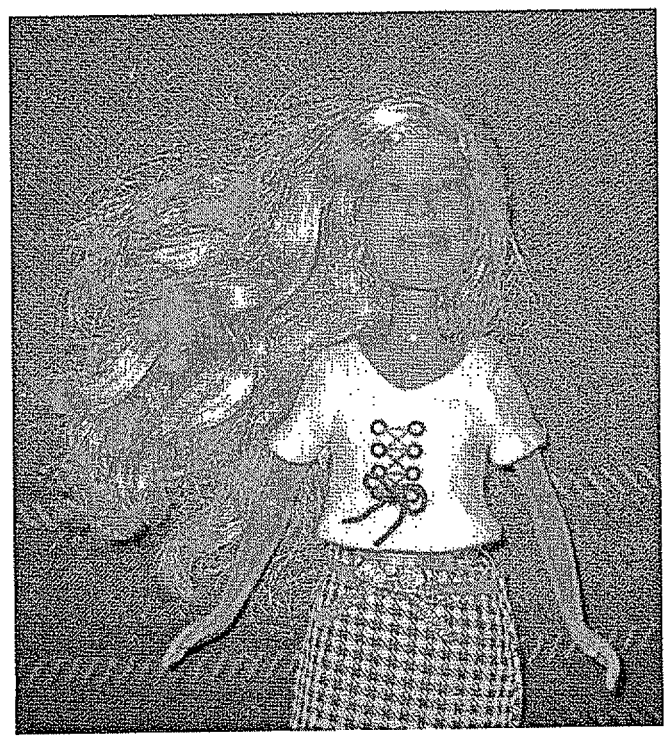
FIG. 33 is a front elevation view of the standard fashion doll, with the mask mounted over the face.
Figure 34:
FIG. 34 is a front elevation view of a masking constructed and adapted for mounting on an action figure.
Figure 35:
FIG. 35 is a front elevation view of the standard action figure with the mask mounted over the face.
Figure 36:
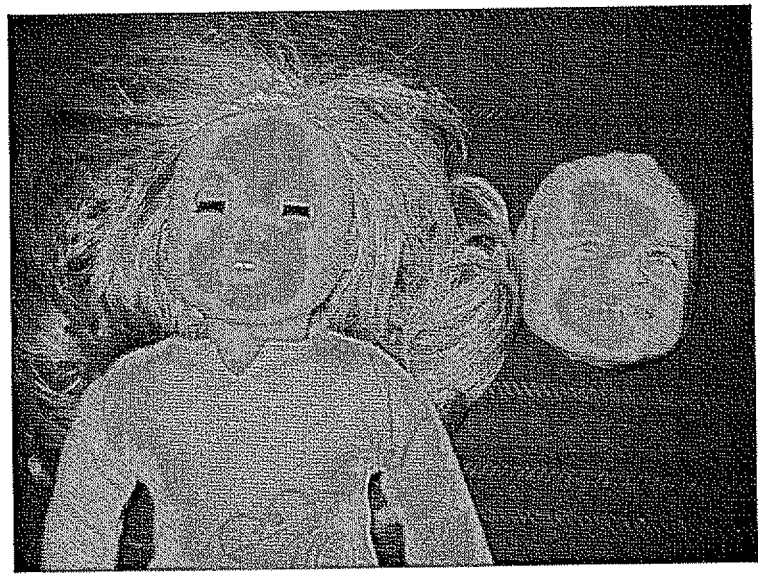
FIG. 36 is a front elevation view of a mask adapted for mounting over a standard doll.
Figure 37:
FIG. 37 is a front elevation view of the standard doll with the mask mounted over the face.

As described above, and shown in FIG. 31, a template 700 can be provided with a plurality of anchor points that can anchor locations, sizes, or both locations and sizes. For example template 700 can have anchors 702 and 704 for anchoring and sizing the eyes from the model, anchor 706 for anchoring the nose from the model, anchor 708 for anchoring and sizing the mouth, and anchors 710 and 712 for anchoring and sizing the ears form the model. The use of a template with anchors allows the features to be individually resized and repositioned, to be appropriate for the particular figure preform or the particular figure with which the face will be applied.

FIGS. 32-33, FIGS. 34-35, and FIGS. 36-37 show embodiments of masks made in accordance with the principles of this invention adapted for mounting on standard, commercially available dolls, such are Barbie® and American Girl® dolls.

Figure 4:
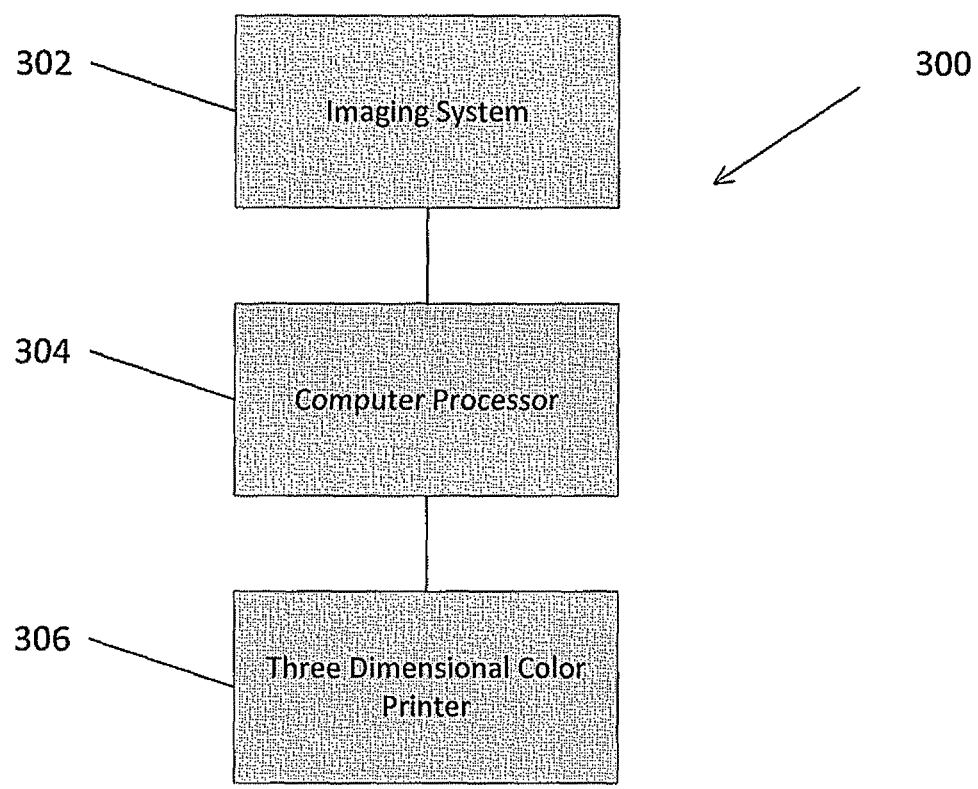
FIG. 4 is a schematic diagram of a system for at least partially customizing a standard figure with the face of a subject according to a preferred embodiment of this invention.

A preferred embodiment of a system for at least partially customizing a standard figure with the face of a subject according to the principles of this invention in indicated generally as 300 in FIG. 4. The system 300 comprises an imaging system 302 for obtaining at least two two-dimensional images of the face of the subject from different perspectives. The system 300 further comprises a computer processor 304 programmed for processing the at least two two-dimensional images of the face of the subject to create a three dimensional model of the subject's face. The processor 304 can also scale the three dimensional model of the subject's face to a predetermined size, and apply the model to a predetermined template having a predetermined perimeter adapted to be mounted on the head of a selected figure. The system further comprises a three dimensional color printer 306 for printing a mask based upon the template with the three dimensional model of the subject's face. This mask can be secure over a conventional doll.

Embodiments of this invention allow a user to make a customized figure, such as a doll, figurine, statue, that have a representation of the user's face, or an idealized or stylized version of the user's face. Other embodiments of this invention allow a user to customize a standard doll with a mask containing a representation of the user's face, or an idealized or stylized version of the user's face. These embodiments allow a user to include himself or herself, as well as his or her friends in their play.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making an at least partially customized figure emulating a subject, the comprising the steps of:
    obtaining at least two two-dimensional images of the face of the subject from different perspectives;
    processing the at least two two-dimensional images of the face of the subject with a computer processor to create a three dimensional model of the subject's face;
    scaling the three dimensional model of the subject's face to a predetermined size using a computer processor;
    automatically resizing at least some of the facial features of the three dimensional model according to one of a plurality of predetermined patterns, each corresponding to a predetermined template;
    applying the three dimensional model of the subject's face to a predetermined template having a predetermined perimeter adapted to interfit with the head of a figure preform that comprises at least a head;
    printing a mask based upon the template with the three dimensional model of the subject's face on a three dimensional color printer; and
    installing the printed mask at least partly in a recess on the head portion of the figure preform at least a portion of the perimeter of the recess corresponding to a portion of the perimeter of the mask.

2. The method according to claim 1 wherein the predetermined template is based upon a user's selection.

3. The method according to claim 1 further comprising automatically repositioning at least one of the facial features of the three dimensional model relative to another of the facial features of the three dimensional model prior to printing.

4. The method according to claim 1 wherein the step of scaling comprises scaling the dimensions of the three dimensional model so that a distance between two selected anatomical features on the face of the model is within a predetermined range.

5. The method according to claim 1 wherein the step of scaling comprises scaling the dimensions of the three dimensional model so that a distance between two selected anatomical features on the face of the model is a predetermined value.

6. The method according to claim 1 wherein the figure preform comprises a doll having a head and a body.

7. The method according to claim 1 further comprising the step of allowing the user to edit the three dimensional model.

8. The method according to claim 1 further comprising storing the three dimensional model and making the three dimensional accessible for editing via the internet.

9. A method of making an at least partially customized figure emulating a subject, the comprising the steps of:
obtaining at least two two-dimensional images of the face of the subject from different perspectives;
processing the at least two two-dimensional images of the face of the subject with a computer processor to create a three dimensional model of the subject's face;
scaling the three dimensional model of the subject's face to a predetermined size using a computer processor;
automatically repositioning at least one of the facial features of the three dimensional model relative to another of the facial features of the three dimensional model prior to printing, the automatic repositioning step comprising changing the position by a predetermined amount;
applying the three dimensional model of the subject's face to a predetermined template having a predetermined perimeter adapted to interfit with the head of a figure preform that comprises at least a head;
printing a mask based upon the template with the three dimensional model of the subject's face on a three dimensional color printer; and
installing the printed mask at least partly in a recess on the head portion of the figure preform at least a portion of the perimeter of the recess corresponding to a portion of the perimeter of the mask.

10. A method of making an at least partially customized figure emulating a subject, the comprising the steps of:
obtaining at least two two-dimensional images of the face of the subject from different perspectives;
processing the at least two two-dimensional images of the face of the subject with a computer processor to create a three dimensional model of the subject's face;
scaling the three dimensional model of the subject's face to a predetermined size using a computer processor;
automatically repositioning at least one of the facial features of the three dimensional model relative to another of the facial features of the three dimensional model prior to printing, the automatic repositioning step comprising changing the position by a predetermined ratio;
applying the three dimensional model of the subject's face to a predetermined template having a predetermined perimeter adapted to interfit with the head of a figure preform that comprises at least a head;
printing a mask based upon the template with the three dimensional model of the subject's face on a three dimensional color printer; and
installing the printed mask at least partly in a recess on the head portion of the figure preform at least a portion of the perimeter of the recess corresponding to a portion of the perimeter of the mask.

11. A method of making an at least partially customized figure emulating a subject, the comprising the steps of:
obtaining at least two two-dimensional images of the face of the subject from different perspectives;
processing the at least two two-dimensional images of the face of the subject with a computer processor to create a three dimensional model of the subject's face;
scaling the three dimensional model of the subject's face to a predetermined size using a computer processor;
automatically repositioning at least one of the facial features of the three dimensional model relative to another of the facial features of the three dimensional model prior to printing, the automatic repositioning step comprising changing the position to a predetermined position;
applying the three dimensional model of the subject's face to a predetermined template having a predetermined perimeter adapted to interfit with the head of a figure preform that comprises at least a head;
printing a mask based upon the template with the three dimensional model of the subject's face on a three dimensional color printer; and
installing the printed mask at least partly in a recess on the head portion of the figure preform at least a portion of the perimeter of the recess corresponding to a portion of the perimeter of the mask.

12. A method of making an at least partially customized figure emulating a subject, the comprising the steps of:
obtaining at least two two-dimensional images of the face of the subject from different perspectives;
processing the at least two two-dimensional images of the face of the subject with a computer processor to create a three dimensional model of the subject's face;
scaling the three dimensional model of the subject's face to a predetermined size using a computer processor;
automatically repositioning at least one of the facial features of the three dimensional model relative to at least one other feature according to one of a plurality of predetermined patterns;
applying the three dimensional model of the subject's face to a predetermined template having a predetermined perimeter adapted to interfit with the head of a figure preform that comprises at least a head;
printing a mask based upon the template with the three dimensional model of the subject's face on a three dimensional color printer; and
installing the printed mask at least partly in a recess on the head portion of the figure preform at least a portion of the perimeter of the recess corresponding to a portion of the perimeter of the mask.

13. A method of making an at least partially customized figure emulating a subject, the comprising the steps of:
obtaining at least two two-dimensional images of the face of the subject from different perspectives;
processing the at least two two-dimensional images of the face of the subject with a computer processor to create a three dimensional model of the subject's face;
scaling the three dimensional model of the subject's face to a predetermined size using a computer processor;
automatically repositioning at least some of the facial features of the three dimensional model relative to at least one other feature according to one of a plurality of predetermined patterns, each corresponding to a predetermined template;

applying the three dimensional model of the subject's face to a predetermined template having a predetermined perimeter adapted to interfit with the head of a figure preform that comprises at least a head;

printing a mask based upon the template with the three dimensional model of the subject's face on a three dimensional color printer; and installing the printed mask at least partly in a recess on the head portion of the figure preform at least a portion of the perimeter of the recess corresponding to a portion of the perimeter of the mask.

14. A method of making an at least partially customized figure emulating a subject, the comprising the steps of:

obtaining at least two two-dimensional images of the face of the subject from different perspectives;

processing the at least two two-dimensional images of the face of the subject with a computer processor to create a three dimensional model of the subject's face;

scaling the three dimensional model of the subject's face to a predetermined size using a computer processor;

applying the three dimensional model of the subject's face to a predetermined template having a predetermined perimeter adapted to interfit with the head of a figure preform that comprises at least a head;

automatically repositioning at least one of the facial features of the three dimensional model relative to another of the facial features of the three dimensional model, and resizing at least one of the facial features of the three dimensional model relative to another of the facial features of the three dimensional model, prior to printing;

printing a mask based upon the template with the three dimensional model of the subject's face on a three dimensional color printer; and installing the printed mask at least partly in a recess on the head portion of the figure preform at least a portion of the perimeter of the recess corresponding to a portion of the perimeter of the mask.

15. A method of making an at least partially customized figure emulating a subject, the comprising the steps of:

obtaining at least two two-dimensional images of the face of the subject from different perspectives;

processing the at least two two-dimensional images of the face of the subject with a computer processor to create a three dimensional model of the subject's face;

scaling the three dimensional model of the subject's face to a predetermined size using a computer processor;

automatically repositioning at least one of the facial features of the three dimensional model relative to another of the facial features of the three dimensional model, and resizing at least one of the facial features of the three dimensional model relative to another of the facial features of the three dimensional model, according to one of a plurality of predetermined patterns;

applying the three dimensional model of the subject's face to a predetermined template having a predetermined perimeter adapted to interfit with the head of a figure preform that comprises at least a head;

printing a mask based upon the template with the three dimensional model of the subject's face on a three dimensional color printer; and installing the printed mask at least partly in a recess on the head portion of the figure preform at least a portion of the perimeter of the recess corresponding to a portion of the perimeter of the mask.

16. A method of making an at least partially customized figure emulating a subject, the comprising the steps of:

obtaining at least two two-dimensional images of the face of the subject from different perspectives;

processing the at least two two-dimensional images of the face of the subject with a computer processor to create a three dimensional model of the subject's face;

scaling the three dimensional model of the subject's face to a predetermined size using a computer processor;

automatically repositioning at least one of the facial features of the three dimensional model relative to another of the facial features of the three dimensional model, and resizing at least one of the facial features of the three dimensional model relative to another of the facial features of the three dimensional model according to one of a plurality of predetermined patterns, each corresponding to a predetermined template applying the three dimensional model of the subject's face to a predetermined template having a predetermined perimeter adapted to interfit with the head of a figure preform that comprises at least a head;

printing a mask based upon the template with the three dimensional model of the subject's face on a three dimensional color printer; and installing the printed mask at least partly in a recess on the head portion of the figure preform at least a portion of the perimeter of the recess corresponding to a portion of the perimeter of the mask, automatically repositioning at least one of the facial features of the three dimensional model relative to another of the facial features of the three dimensional model, and resizing at least one of the facial features of the three dimensional model relative to another of the facial features of the three dimensional model according to one of a plurality of predetermined patterns, each corresponding to a predetermined template.

17. A method of making an at least partially customized figure emulating a subject, the comprising the steps of:

obtaining at least two two-dimensional images of the face of the subject from different perspectives;

processing the at least two two-dimensional images of the face of the subject with a computer processor to create a three dimensional model of the subject's face;

scaling the three dimensional model of the subject's face to a predetermined size using a computer processor;

applying the three dimensional model of the subject's face to a predetermined template having a predetermined perimeter adapted to interfit with the head of a figure preform that comprises at least a head the step of applying the three dimensional model to a predetermined template comprising registering the face relative to the template using at least one facial feature of face of the three dimensional model;

printing a mask based upon the template with the three dimensional model of the subject's face on a three dimensional color printer; and installing the printed mask at least partly in a recess on the head portion of the figure preform at least a portion of the perimeter of the recess corresponding to a portion of the perimeter of the mask.

18. The method according to claim 17 further comprising recording a selection of one of a plurality of doll preforms, and wherein predetermined template is a template that corresponds to the recorded selection of one of a plurality of doll preforms.

* * * * *